(12) United States Patent
Howey et al.

(10) Patent No.: US 7,386,566 B2
(45) Date of Patent: Jun. 10, 2008

(54) EXTERNAL METADATA PROCESSING

(75) Inventors: James K. Howey, Seattle, WA (US);
Jeffrey R. Bernhardt, Woodinville, WA (US); Theodore T. Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 10/891,609

(22) Filed: Jul. 15, 2004

(65) Prior Publication Data
US 2006/0015521 A1 Jan. 19, 2006

(51) Int. Cl.
*G06F 17/00* (2006.01)
(52) U.S. Cl. .................. 707/102; 707/10; 707/101; 707/103 Y; 707/104.1; 709/230; 709/238
(58) Field of Classification Search ............... 707/200, 707/10, 101, 102, 103 Y, 104.1; 715/513; 709/310, 230, 238
See application file for complete search history.

(56) References Cited

U.S. PATENT DOCUMENTS

| | | | |
|---|---|---|---|
| 5,724,575 A | 3/1998 | Hoover et al. | 395/610 |
| 6,009,428 A | 12/1999 | Kleewein et al. | 707/10 |
| 6,748,388 B1 | 6/2004 | Kasamsetty et al. | 707/10 |
| 2005/0055631 A1* | 3/2005 | Scardina et al. | 715/513 |
| 2005/0114368 A1* | 5/2005 | Gould et al. | 707/100 |
| 2005/0114369 A1* | 5/2005 | Gould et al. | 707/100 |
| 2005/0182854 A1* | 8/2005 | Pinkerton et al. | 709/238 |
| 2005/0187983 A1* | 8/2005 | Narang et al. | 707/200 |
| 2006/0069792 A1* | 3/2006 | Pinkerton et al. | 709/230 |

OTHER PUBLICATIONS

Robert Sargent, "Verification and Validation of Simulation Models", ACM, 2003, pp. 37-48.*
Larsen, D. et al., "Data Transformation Services (DTS) in Microsoft SQL Server 2000", *MSDN Home*, Sep. 2000, 10 pages, http://msdn.microsoft.com/library/en-us/dnsql12k/html/dts_overview.asp?frame=true, XP002297456.

* cited by examiner

*Primary Examiner*—Thuy N Pardo
(74) *Attorney, Agent, or Firm*—Woodcock Washburn LLP

(57) ABSTRACT

The operation of a data flow is improved by providing for validation of the consistency of the data flow with the external data files it works with, even in the face of changes in those external data files Metadata is stored regarding the external data files. Because external data files may change, this metadata is used when determining whether the external data files are still compatible with the data flow. In such performing such validation, the metadata tracks what changes in the external data files have occurred, and allows increased flexibility in presenting the user with options or in automatically fixing the data flow to correspond with changes in external data files. When the external data files are not available, the stored metadata can be used to validate the data flow to the last information regarding the external data files. The external metadata can be resynchronized to the data flow or to the external data files to provide updated external metadata for later validation.

19 Claims, 4 Drawing Sheets

EXTERNAL METADATA PROCESSING

FIELD OF THE INVENTION

This invention relates in general to the field of information technology. More particularly, this invention relates to the creation and updating of metadata regarding data flows and the use of metadata to allow data flows to be validated.

BACKGROUND OF THE INVENTION

Large collections of data may be used in complex ways. For example, collections of data, such as in files, databases, and other data storage means, may be opened, queried, or used as part of a long string of activities, with different transformative activities occurring to the data, and with resulting data then stored.

For example, FIG. 1 is a block diagram of a data flow with two data inputs and two data outputs. As shown in FIG. 1, a file A and a database table A are both opened. As shown in FIG. 1, data is read from the file A 1000 and data is read from the database table A 1010. A union 1020 is performed on these two sets of data. The result of the union is examined, to determine (box 1030), for each record in the union of data, whether the value stored in an associated age field is less than fifty. For records where the associated age field is less than fifty, the records are aggregated by gender 1040, and stored in a database table B 1050. For records where the associated age field is not less than fifty, the records are stored in a file B 1060.

In order to allow for the use of large complex collections of data, ETL (Extract Transform Load) tools have been developed. These tools provide an automated way to perform operations using collections of data. ETL tools automate the tasks of extracting data—taking data from a data source; transforming data—utilizing the extracted data; and loading data—storing the result of the transformation is stored for later use. For example, the actions shown in actions are performed by an ETL tool.

In order to allow the easy use of such ETL functionality and expand the functionality available, design tools which allow the visual design of processes which use files or other data collections have been developed. One such design tool is known as Data Transformation Services (DTS), available from Microsoft Corporation. DTS allows a user to visually design processes by which data in files, databases, or other data collections can be used. The operations in the processes designed by DTS may include but are not limited to those available through standard ETL tools. For example, a DTS-designed data flow may allow a user to specify that certain files will be deleted, other files obtained (e.g. by file transfer protocol (FTP) from a designated source), and that a specific ETL process will then be performed on each file so obtained.

The data flow designed by an ETL tool or a design tool such as DTS is designed in advance of its use. This can lead to ambiguities when the data flow is used. For example, a data flow is designed to open a data source and, for each record in the data source, and read information in a specific column A and column C. However, at run-time, upon opening the data source, it may be that the data source contains, for each record, information in a column A, column B, column C and column D.

It may be that the designer of the data flow knew that column B would be included in the data source. If so, a design choice may have been made not to read information from column B, in order to minimize the time and other computational costs for doing so. Thus, asking the user at run-time whether column B should be included could cause unnecessary confusion and delay.

However, it may be that the designer of the data flow did not know that column D would be included in the data source, and that the user of the data flow would find column D useful to include in the data flow. Thus, asking the user at run-time whether column D should be included would be useful.

However, there is no way to distinguish between situations in which data was intentionally not included from a data source, and situations in which the data source has changed. Thus, either unnecessary questions are put to the user at run-time, or useful data may be lost.

Additionally, other changes may be made to a data collection. For example, the type of column A may have been changed from what is expected. This may or may not be compatible with the operations designed for column A in the data flow. Some changes in data type may allow operations may proceed successfully but with unexpected results. However, there is no way to tell whether the change was anticipated, or whether it was not. Again, the user is either consulted on data type incompatibilities, even in cases in which the change was anticipated, or the user is not consulted, which may allow problems to develop.

Thus, there is a need for a system and method to overcome these deficits in the prior art. The present invention addresses the aforementioned needs and solves them with additional advantages as expressed herein.

SUMMARY OF THE INVENTION

The invention allows for external metadata to be stored regarding the content of the external data files (or data collections) which will be used for the data flow. Because of the storage of such information, later, the contents of the data collections can be examined and the external metadata used in order to determine whether any changes have occurred to the data collections, and if so, what actions might be taken. Data flow information describing the data flow and stored external metadata about the data collections being used by in the data flow are examined to determine whether the information is consistent. If not, the user may be consulted, or automatic means (such as type conversions) may occur.

When the data collections are not available, the external metadata may still be used in order to determine whether the data flow is compatible with the data collections, as reflected in the external metadata. The data flow may be changed to ensure compatibility.

Resynchronization of the external metadata can update the external metadata to ensure continuous benefits from the storage of the external metadata.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
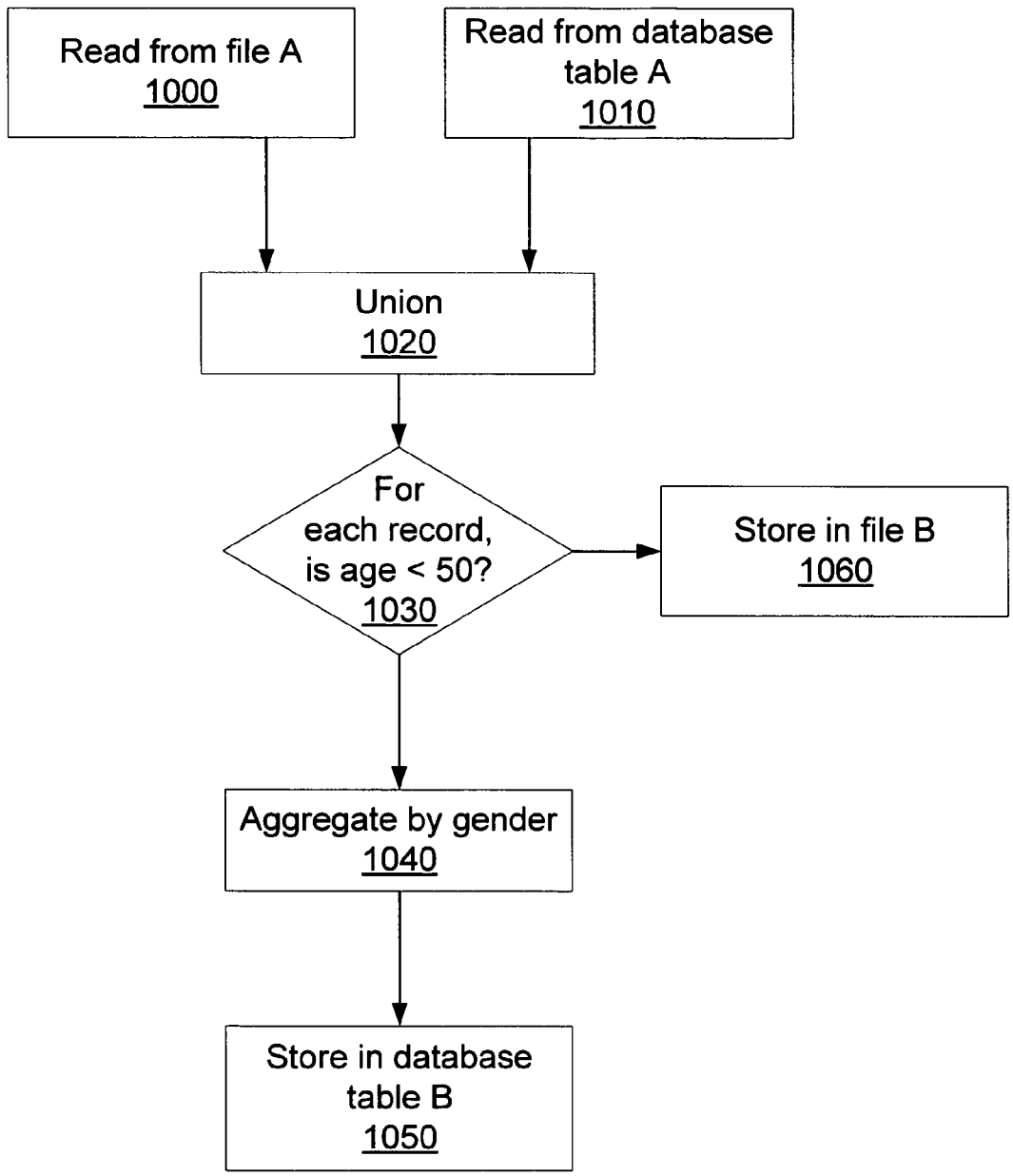
FIG. 1 is a diagram of a data flow.
Figure 2:
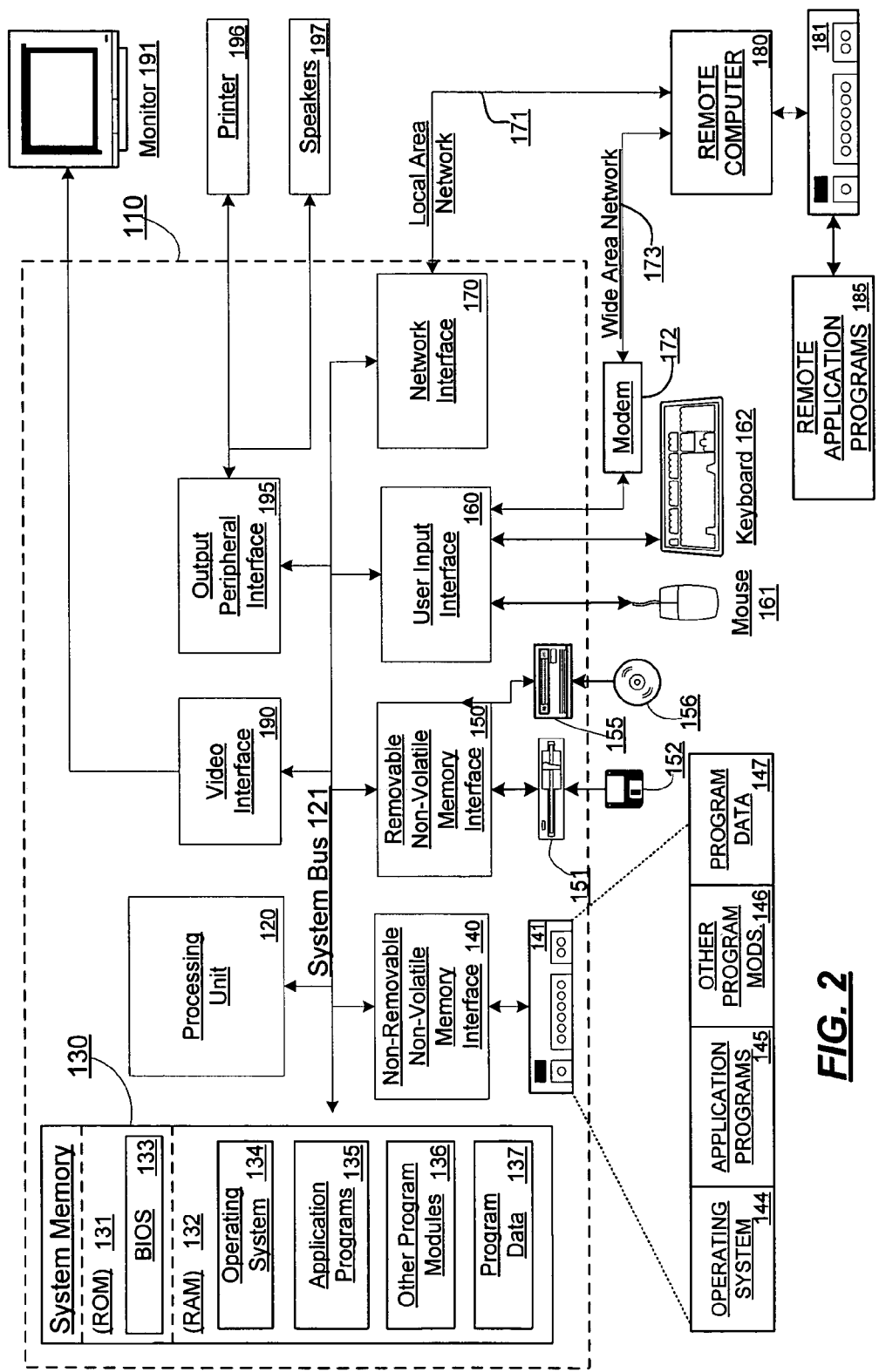
FIG. 2 is a block diagram of an exemplary computing environment in which aspects of the invention may be implemented.

FIG. 2 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

External Metadata Processing System

When a data flow is created, input and output data collections are identified for the data flow. These input and output data collections for the data flow are queried, and external metadata (metadata about the external sources of data used for the data flow) is retrieved and stored for each of the data collections. The metadata for a data collection describes the information available in the data collection.

In one embodiment, each input or output data collection includes record information. For each record, a number of columns are stored. External metadata retrieved for the data collection will store, for each column available in the data collection, a variety of metadata describing the column:

Data Type: The type of the data stored in the column
Length: The length of the data stored in the column
Precision: Precision of the data stored in the column
Code Page: The code page of the data stored in the column if the data type of the column is character based. A code page is an ordered set of characters in which a numeric value is assigned to each character in the code page.
Scale: The scale of the data stored in the column if the data is numeric in nature. The scale is the number of digits to the right of the decimal point in the data.

In other embodiments, other varieties of metadata describing the columns available may also be stored.

This external metadata is initially stored when the data flow is set up or configured. The first version of external metadata describes the data collections as they existed when the data flow was designed. The external metadata may then be used at runtime for the data flow in order to determine whether changes have occurred to the data flow. As described below, the external metadata may be updated through resynchronization.

Validation and Resynchronization

When the data flow is to be used, the external metadata can be used to validate the use of the data flow with the data collections as they exist at the current time. In this way, any relevant changes to the data collections can be detected. Additionally, validation information can be used in order to determine how any changes detected may be resolved.

Figure 3:
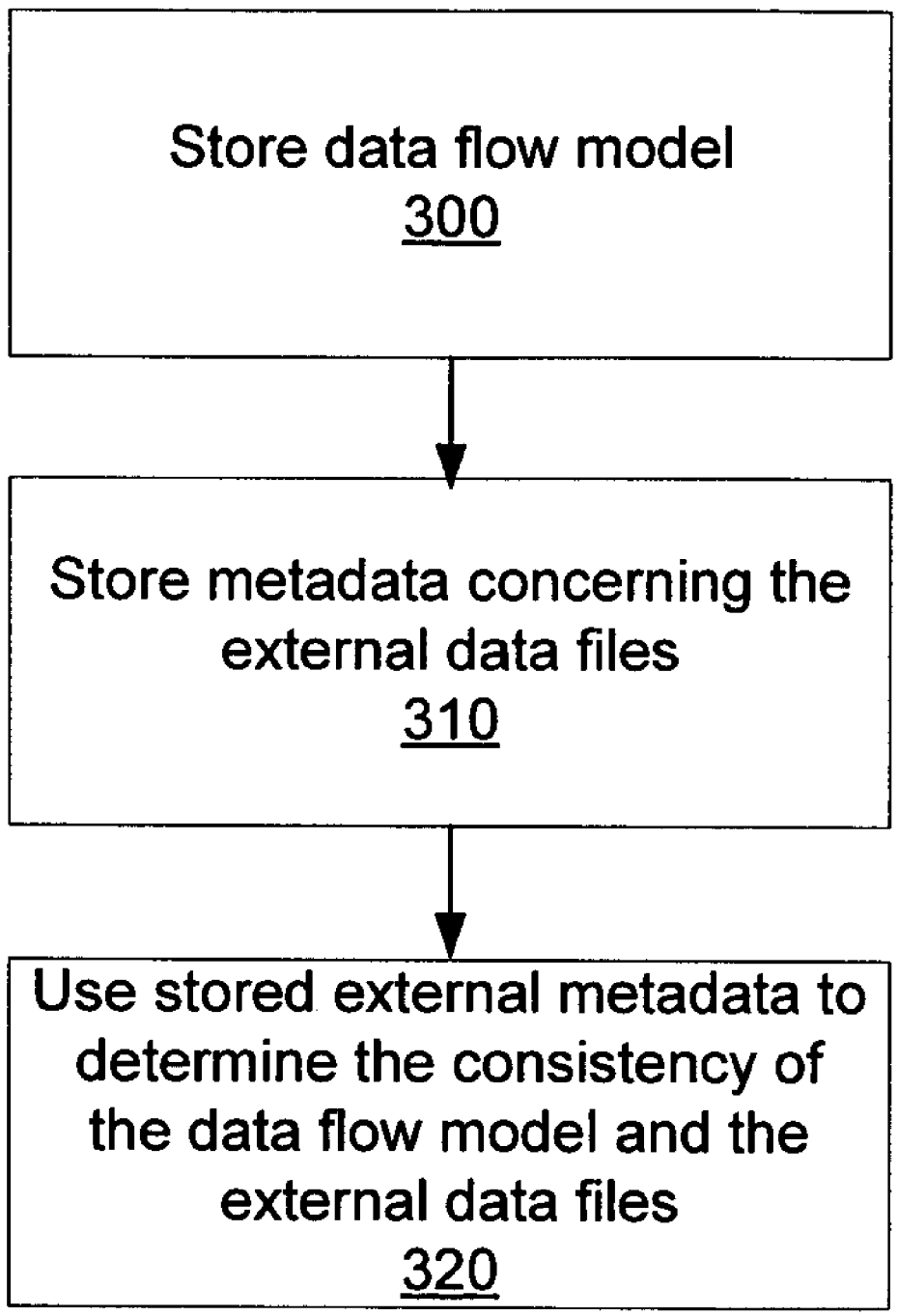
FIG. 3 is a flow diagram of method for preparing data flow information regarding a data flow using at least one external data file according to one embodiment of the invention.

FIG. 3 is a flow diagram of method for preparing data flow information regarding a data flow using at least one external data file according to one embodiment of the invention. As shown in FIG. 3, step 300, a data flow model is stored. The data flow module includes information describing the data flow, and describing the use, in the data flow, of at least one column from each of a number of external data files (data collections.) In step 310, metadata is stored. The stored external metadata describes the columns present in the external data files/data collections. Then, in step 320, the stored metadata is used to determine whether the data flow model and the external data files are consistent. This is termed validation.

Validation may be either connected or disconnected. Connected validation occurs when the data collection is available (connected) and can be queried to determine information about the contents of the data collection and compare it to the stored external metadata. Connected validation determines whether the relevant state of each of the current data collections is satisfactorily represented in the external metadata or whether a problem exists due to some change or corruption in a data collection. In one embodiment, a validation status for each data collection is determined. If any data collection is assigned a validation status indicating a problem exists, then the user is queried to determine what action should be taken. Additionally, connected validation also compares the relevant state of each of the data collections with the information required by the data flow. Again, such state information is used to detect alterations in the data collections which may cause problems when the data flow is run.

Disconnected validation compares the external metadata to the information required by the data flow, without reference to any changes in the data collections. A user may chose to perform disconnected validation, for example, when the data collections are unavailable. Thus a user who lacks a current connection to the data collections, for example, while disconnected from a network which provides the user access to the data collections, can still perform disconnected validation. Such validation will allow the user to identify potentially problematic changes to the data flow without necessitating a connection to the data collections.

Resynchronization changes the data flow in order to maintain its compatibility with the current data collection (in the case of connected resynchronization) or with the current stored external metadata (disconnected resynchronization). A fix is made which minimizes changes to the rest of the objects in the data flow and minimizes necessary user interaction.

Connected Validation and Resynchronization

As discussed, when connected validation occurs, a data collection is again queried to determine what the external metadata is for that data collection. A comparison is made to the stored external metadata for that data collection. If differences exist, they are thus detected.

As shown in Table 1, there are several scenarios which may occur at validation time:

TABLE 1

Connected Validation - Possible Scenarios at Validation Time When Comparing Data Collection to Stored External Metadata

| Column Present in Data Collection? | Column Present in Stored External Metadata? | Type in Data Collection | Type in Stored External Metadata | Inference |
|---|---|---|---|---|
| No | Yes | | X | A column is no longer present in the data collection |
| Yes | No | X | | A column has been added to the data collection |
| Yes | Yes | X | X | No change in external metadata detected |
| Yes | Yes | X | Y | A column has changed data type in the data collection |

In the first scenario, the column is present in the data collection, but not in the stored external metadata. Thus, the inference is that the column, which did exist when the external metadata was created, has since been deleted from the data collection. In the second scenario, a column which did not exist at the time of the collection of the stored external metadata now exists in the data collection, thus the inference is that a column has been added to the data collection. In the third and fourth scenarios, the column was present in the data collection and is also present in the stored external metadata. In the third scenario, the type information collected in the stored external metadata is consistent with the type information in the data collection. Thus, no change in external metadata for the column is detected. However, in the fourth scenario, the column has changed data type in the data collection. In such a scenario, in one embodiment, a user will be informed of the incongruity. In one embodiment, the user may be given an opportunity to fix the data type in the stored external metadata.

In addition, in one embodiment, validation is also performed with reference to the columns actually used by the data flow for the data collection. The scenarios which may occur are shown in Table 2:

TABLE 2

Connected Validation - Possible Scenarios at Validation Time Comparing Data Collection to Data Flow Information

| Column Present in Data Collection? | Column Present in Data Flow? | Type in Data Collection | Type Expected in Data Flow | Inference/Validation Consequence |
|---|---|---|---|---|
| No | Yes | | X | A column referenced by the data flow has been deleted from the source / request user input |
| Yes | No | X | | A column in the data collection is not referenced in the data flow |
| Yes | Yes | X | X | Column in the data collection is referenced in the data flow, all type information is in sync |
| Yes | Yes | X | Y | Column in the data collection is referenced in the data flow, all type information is out of sync / attempt to resolve |

Thus, as can be seen in the first scenario of Table 2, where a column is present in the data flow but not present in the data collection a validation problem occurs. The column being used in the data flow is not present in the data collection. In such a scenario, in one embodiment, user input is requested in order to resolve the validation problem.

In the second and third scenarios, no validation problem is encountered. The column in the data collection is not referenced in the data flow, or the column in the data collection is referenced in the data flow and all type information corresponds. In these scenarios, no validation problem is encountered. Either the column is not used in the data flow or the column is used and the type information is as expected.

In the fourth scenario, the column is present in the data collection and referenced in the data flow, however, the type information has changed. In such a case, in one embodiment, an attempt to resolve the inconsistency is made. If the types are compatible, such that a conversion exists which can resolve any type inconsistencies, then the conversion can be used, and so the inconsistency is resolved. If the types are compatible, but the condition can be fixed by the data flow in some other way (e.g. via a method implemented in the data flow) then, again, the inconsistency is resolvable. However, if the types are incompatible and the condition cannot be otherwise fixed, then the validation can not be completed because of the incompatibility. In one embodiment, the user is prompted to resolve the incompatibility.

As the result of validation, a validation state may be returned. For example, in one embodiment a validation state of ISVALID reflects that there is no problem with the validation. A validation state of ISBROKEN indicates that a problem exists but that the problem is resolvable, either by the user or through a method in the data flow. For example, as described above, type inconsistency conversions may be available which can resolve a type inconsistency. A validation state of NEEDSNEWMETADATA indicates that resynchronization (described below) should be performed. A validation state of ISCORRUPT indicates problems which cannot be simply resolved.

When the data collections change, the stored metadata is reflective of the state of the data collections at a prior time. Resynchronization resynchronizes the stored external metadata with the data collection information (connected resynchronization) or the data flow information (disconnected resynchronization.).

For connected resynchronization, the stored external metadata is changed to harmonize with the data collection information found. In one embodiment, where a column has been found present in a data collection which is not found in the stored external metadata, information about that column is added to the stored external metadata. Where a column is present in both the stored external metadata and in a data collection, but the type information has changed, then the stored external metadata is updated with the new type information from the data collection.

Similarly, in connected resynchronization, the data flow is updated to reflect changes in the data collection information. Where a column referenced in the data flow is no longer available in the data collection, the column will be deleted from the data flow. Additionally, when the type has changed for a column for which information is found in the stored external metadata and in the data flow, as discussed above with reference to validation, there may be a way to resolve the difference, and in resynchronization the difference will be resolved if it is possible. In one embodiment, an exposed method of the data flow can be called to resolve the inconsistency, and the data flow will be changed. In another embodiment, a request is made to the user to resolve the inconsistency.

Disconnected Validation and Resynchronization

As discussed, when disconnected validation occurs, the data collection is not queried. The stored external metadata is compared to the data flow to ensure that they are compatible. The possible scenarios are shown in Table 3:

TABLE 3

Disconnected Validation - Possible Scenarios at Validation Time Comparing Stored Metadata to Data Flow Information

| Column Present in Stored External Metadata? | Column Present in Data Flow? | Type in Stored External Metadata | Type Expected in Data Flow | Inference/Validation Consequence |
|---|---|---|---|---|
| No | Yes | | X | A column referenced by the data flow has been deleted from the source / request user input |
| Yes | No | X | | A column in the data collection is not referenced in the data flow |
| Yes | Yes | X | X | Column in the data collection is referenced in the data flow, all type information is in sync |
| Yes | Yes | X | Y | Column in the data collection is referenced in the data flow, all type |

TABLE 3-continued

Disconnected Validation - Possible Scenarios at Validation Time Comparing Stored Metadata to Data Flow Information

| Column Present in Stored External Metadata? | Column Present in Data Flow? | Type in Stored External Metadata | Type Expected in Data Flow | Inference/Validation Consequence |
|---|---|---|---|---|
| | | | | information is out of sync / attempt to resolve |

Thus, as can be seen in the first scenario of Table 3, where a column is present in the data flow but not present in the stored external metadata a validation problem occurs. The column being used in the data flow is not indicated by the stored external metadata as being present in the data collection. In such a scenario, in one embodiment, user input is requested in order to resolve the validation problem.

In the second and third scenarios, no validation problem is encountered. The column indicated as being present in the stored external metadata is not referenced in the data flow, or the column indicated as being present in the stored external metadata is referenced in the data flow and all type information corresponds. In these scenarios, no validation problem is encountered. Either the column is not used in the data flow or the column is used and the type information is as expected.

In the fourth scenario, the column is present in the stored external metadata and referenced in the data flow, however, the type information has changed. In such a case, in one embodiment, an attempt to resolve the inconsistency is made. If the types are compatible, such that a conversion exists which can resolve any type inconsistencies, then the conversion can be used, and so the inconsistency is resolved. If the types are compatible, but the condition can be fixed by the data flow in some other way (e.g. via the dataflow component's interface) then, again, the inconsistency is resolvable. However, if the types are incompatible and the condition cannot be otherwise fixed, then the validation can not be completed because of the incompatibility. In one embodiment, the user is prompted to resolve the incompatibility.

Figure 4:
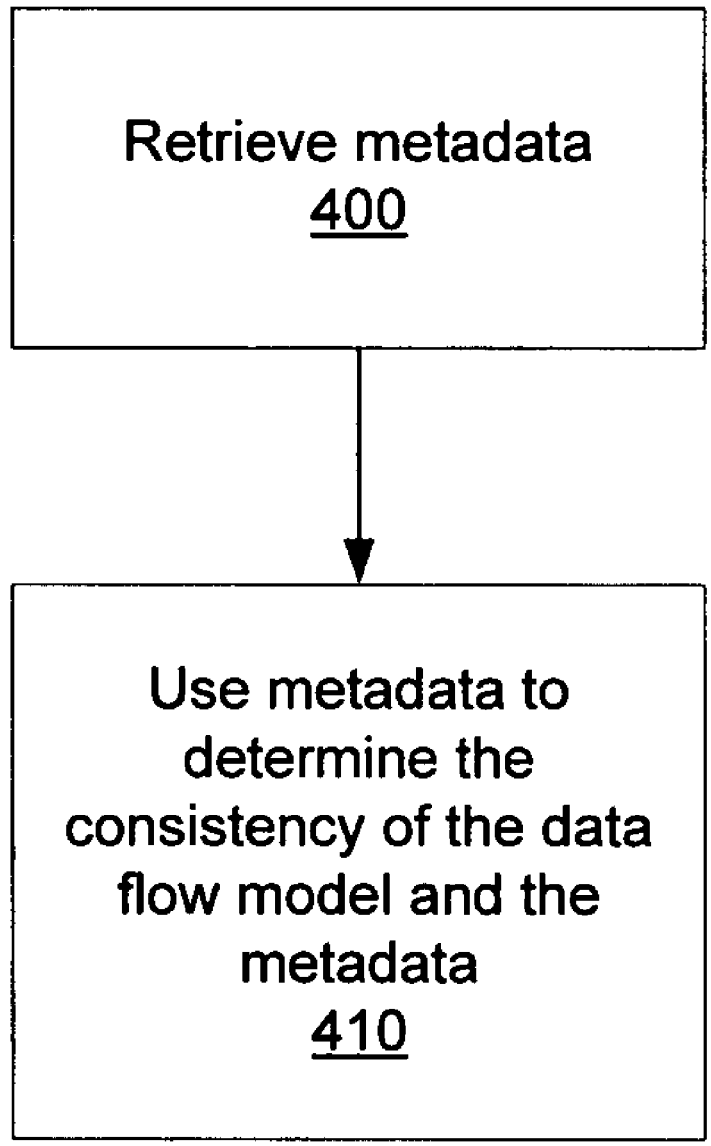
FIG. 4 is a flow diagram of method for evaluating a data flow model according to one embodiment of the invention.

FIG. 4 is a flow diagram of method for evaluating a data flow model according to one embodiment of the invention. In step 400, metadata describing the external data files is retrieved. In step 410, this data is used to determine wither the data flow model and the metadata are consistent.

Where disconnected resynchronization rather than disconnected validation is performed, the data flow is changed to harmonize with the understanding of the data collections reflected in the stored external metadata. Thus, in one embodiment, if a column is present in the data flow but not in the stored external metadata, the column in the data flow is deleted to reflect the understanding that the column is not available in the data collections, as indicated by the absence of the column in the stored external metadata. Additionally, if the data flow and the stored external metadata contain different type information for a column, the difference will be resolved if it is possible. In one embodiment, an exposed method of the data flow can be called to resolve the inconsistency, and the data flow will be changed. In another embodiment, a request is made to the user to resolve the inconsistency.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for preparing data flow information regarding a data flow using at least one external data file, each of said external data files comprising columns of information, said method comprising:
storing in a first computer readable medium, a data flow model, said data flow model comprising use data describing, for each of said at least one external data file, a use of at least one column from said external data file;
storing in a second computer readable medium, metadata comprising data describing at least one column of each of said at least one external data file;
performing a disconnected validation when the first computer readable medium is inaccessible, the disconnected validation comprising:
identifying a potential problem in said at least one external data file by comparing the stored metadata against said at least one external data file without reference to said data flow model; and
performing a connected validation when both the first computer readable medium and the second computer readable medium are accessible, the connected validation comprising:
using said stored metadata to determine whether said data flow model and said external data files are consistent.

2. The method of claim 1, where said data describing at least one column comprises type data relating to said at least one column.

3. The method of claim 1, where using said stored metadata to determine whether said data flow model and said external data files are consistent comprises:
for each external data file, verifying that said stored metadata is consistent with a current state of said external data file.

4. The method of claim 3, where verifying that said stored metadata is consistent with the current state of said external data file comprises:
determining if each column described in said stored metadata is present in said external data file; and
determining if each column in said external data file is described in said stored metadata.

5. The method of claim 4, where said data describing at least one column comprises type data describing a type of data stored in the column, and where verifying that said stored metadata is consistent with the current state of said external data file further comprises:

determining if said type data for each column described in said stored metadata is consistent with the type data for said column in said external data file.

6. The method of claim 3, where using said stored metadata to determine whether said data flow model and said external data files are consistent further comprises:
providing a validation state indicating whether said stored metadata is consistent with said current state of said external data file.

7. The method of claim 3, where using said stored metadata to determine whether said data flow model and said external data files are consistent further comprises:
if said stored metadata is not consistent with said current state of said external data file, resolving said inconsistency.

8. The method of claim 7, where said resolving of said inconsistency comprises:
querying the user to resolve said inconsistency.

9. The method of claim 7, where said resolving of said inconsistency comprises:
using an interface of said data flow to resolve said inconsistency.

10. The method of claim 1, further comprising:
resynchronizing said stored metadata to comprise data reflecting the current data stored in each of said external data file.

11. The method of claim 1, further comprising:
determining whether said data flow model and said external data files are consistent by determining if each said use of at least one column from said external data file described in said use data is possible given a current state for each of said external data file.

12. The method of claim 11, where determining whether said data flow model and said external data files are consistent by determining if each said use of at least one column from said external data file described in said use data is possible given a current state for each of said external data file comprises:
providing a validation state indicating whether said data flow model is consistent with said current state of said external data files.

13. The method of claim 11, where determining whether said data flow model and said external data files are consistent by determining if each said use of at least one column from said external data file described in said use data is possible given a current state for each of said external data file comprises:
if said stored metadata is not consistent with said current state of said external data files, resolving said inconsistency.

14. The method of claim 13, where said resolving of said inconsistency comprises:
querying the user to resolve said inconsistency.

15. The method of claim 13, where said resolving of said inconsistency comprises:
using an interface of said data flow to resolve said inconsistency.

16. The method of claim 11, further comprising:
resynchronizing said data flow to reflect said current state of said external data files.

17. The method of claim 1, where identifying the potential problem comprises:
  verifying that said stored metadata is consistent with said data flow.

18. The method of claim 17, where said verifying that said stored metadata is consistent with said data flow comprises:
  determining if each said use of at least one column from said external data file described in said use data is consistent with said stored metadata.

19. The method of claim 18, further comprising:

if each said use of at least one column from said external data file described in said use data is not consistent with said stored metadata, resolving said inconsistency.

* * * * *